US005894816A

United States Patent [19]
Coiro, Sr. et al.

[11] Patent Number: 5,894,816
[45] Date of Patent: Apr. 20, 1999

[54] CAGE FOR HOUSING ANIMALS AND METHOD FOR ENHANCING FLOOR SPACE OF SAME

[75] Inventors: Michael A. Coiro, Sr., Jacobstown; Augusto R. Sarrol, Burlington, both of N.J.

[73] Assignee: Allentown Caging Equipment Co., Inc., Allentown, N.J.

[21] Appl. No.: 08/941,491

[22] Filed: Sep. 30, 1997

[51] Int. Cl.[6] .................................................. A01K 1/03
[52] U.S. Cl. ............................................................ 119/417
[58] Field of Search .................................. 119/417, 418, 119/419, 452, 473, 416; 206/519, 520

[56] References Cited

U.S. PATENT DOCUMENTS

| | | | |
|---|---|---|---|
| 1,971,075 | 8/1934 | Lockwood | 206/519 X |
| 4,093,947 | 6/1978 | Morse | 206/519 |
| 4,828,112 | 5/1989 | Vollrath et al. | 206/519 |
| 5,573,698 | 11/1996 | Mandler et al. | 206/519 X |

*Primary Examiner*—Robert P. Swiatek
*Attorney, Agent, or Firm*—Mathews, Collins, Shepherd & Gould, P.A.

[57] ABSTRACT

A cage receptacle for housing laboratory creatures having an enhanced floor space. The receptacle is of the type having a base and a sidewall extending upwardly from the base. The sidewall has a bottom wall section and a top wall section with differing widths that together define a jag. The jag permits one to increase the square space allocation of the receptacle while retaining compatibility with prior art top covers and maintaining the stackability of the receptacles (inside another receptacle). A method for enhancing the floor space of laboratory cage receptacles is also disclosed.

16 Claims, 6 Drawing Sheets

CAGE FOR HOUSING ANIMALS AND METHOD FOR ENHANCING FLOOR SPACE OF SAME

FIELD OF THE INVENTION

The present invention relates to a cage for holding animals and, in particular, an improved cage receptacle that provides enhanced floor space while maintaining compatibility with existing cage accessories. The invention further involves a method of providing enhanced floor space for animal cages.

BACKGROUND OF THE INVENTION

Many investigators and researchers use mice, hamsters, and other rodents or creatures in their experimentation and research. Often, the creatures must be housed before, during, or after the course of the research or experimentation, for example, for preparation or observation. Cages fabricated with plastic or other polymeric material have been used for this purpose. Such cages typically are equipped with internal wire bar lids and top covers or "microbarrier tops." The wire bar lids are useful in retaining food, and the microbarrier tops cover the cage and typically have a plurality of permeable sections and/or filters in their top surfaces for filtering the air or providing air inside the cages.

Additionally, it is important that the cages be stackable or capable of being nestled inside of one another for compact storage. The cages typically are configured to fit or slide within rack units, and these rack units may be connected to sources for automatically providing water, food, or air to the creatures inside the cages.

To illustrate, FIG. 1 shows a perspective view of a prior art cage apparatus 10 having a bottom receptacle 20, a wire bar lid 30, and a microbarrier top 40. FIG. 2A shows a cross-sectional length-wise view of the receptacle 20 and microbarrier top 40 taken along the line A—A of FIG. 1; FIG. 2B shows a cross-sectional width-wise view of the receptacle 20 and microbarrier top 40 taken along the line B—B of FIG. 1; and FIG. 2C shows a cross-sectional side view of the wire bar lid 30 taken along the line A—A of FIG. 1. As can be seen from these Figures and as will be explained in further detail later, the receptacle 20 has an upper rim 21; the wire bar lid 30 has a flat edge 38 that encircles its periphery; and the microbarrier top comprises a centrally-disposed promontory 42 and a surrounding lip portion 46. These parts (receptacle, lid, and top), are sized and configured so that the rim of the receptacle 21 will hold the wire bar lid 30 and microbarrier top 40 in place on the receptacle; the edge 38 of the lid 30 rests against the rim 21, and the lip 46 of the microbarrier top 40 snap-fits over the rim 21. As a further illustration, reference is made to the following U.S. patents which show animal cages having an open top body (receptacle), a wire bar lid, and a filter cap (microbarrier top). See U.S. Pat. No. 4,640,228 issued Feb. 3, 1987 to Sedlacek, entitled "Animal Cage Assembly With Reusable Filter Cap"; U.S. Pat. No. 4,480,587, issued Nov. 6, 1984, also to Sedlacek and entitled "Animal Cage Assembly With Reusable Filter Cap"; and U.S. Pat. No. 5,165,362 issued Nov. 24, 1992 to Sheaffer et al. entitled "Ventilated Cage and Open Rack System."

Such cage apparatuses have been sold for many years, and users naturally have accumulated inventories of racks and cages, including the wire bar lids and microbarrier tops to be used with the receptacles. These items are fabricated to be durable and permit for re-use and refurbishing. See, e.g., U.S. Pat. Nos. 4,480,587 and 4,640,228, referenced recommended square-inch space allocations for housing commonly-used laboratory rodents. The NRC recommended an increased square-inch space allocation, that is, many prior art cages having the receptacles, wire bar lids, and microbarrier tops as previously described have a smaller square-inch space allocation than was recommended in the Guide.

Since the publication of the Guide, the laboratory cage industry has attempted to provide new cage designs with larger square-inch space allocations. In 1996, Lab Products Inc. advertised a mouse cage which it claimed in advertisements houses five mice while complying with the space requirements of the Guide. In increasing the space allocation of this cage, however, the dimensions of the cage receptacle were changed (i.e., increased), such that new wire bar lids and microbarrier tops would have to be purchased to fit the newly-sized cages.

Thus, there is a need for a new cage design enhancing the floor space of the cage receptacle as compared with prior art cages, while maintaining compatibility with existing wire bar lids and microbarrier tops. Further, there is a need for a cage that achieves this greater floor space but is also stackable. Preferably, the cage should be comprised of a single, integral unit, avoiding the need for the assembling or disassembling of parts prior to storing or stacking.

SUMMARY OF THE INVENTION

Summarily described, the invention embraces a receptacle for housing laboratory creatures. The receptacle has a base and at least one sidewall extending upwardly from the base and terminating in a rim. The sidewall has a bottom wall section and a top wall section. The bottom wall section is wider than the top wall section, and the difference in width of the two sections defines a jag. The jag permits an increase in the usable floor space of the receptacle while retaining its compatibility with prior art top covers and allows for the stacking of one receptacle inside another.

The invention further comprises a method of enhancing the square space allocation of a laboratory cage receptacle while retaining its stackability and compatibility with existing top covers. The method comprises the steps of widening the base of the receptacle; decreasing the angle between the horizontal plane of the base and the inner sidewall; and placing a jag in the sidewall. The widened base and decreased angle of the sidewall expand the usable floor space of the receptacle, and the jag allows for the stacking of one receptacle inside another and retains dimensions at the rim suitable for receiving existing top covers.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

The invention relates to a laboratory cage receptacle, a preferred embodiment of which is illustrated in FIGS. 3 through 6 and described below with reference to those figures. An important feature of the cage receptacle involves its compatibility with existing, standard-sized wire bar lids and microbarrier tops. Thus, the features and dimensions of prior art cages will first be described to illustrate a manner of use for the invention and provide background regarding its features and advantages. It is understood, however, that the invention is not limited to use with such prior art top covers.

Figure 1:
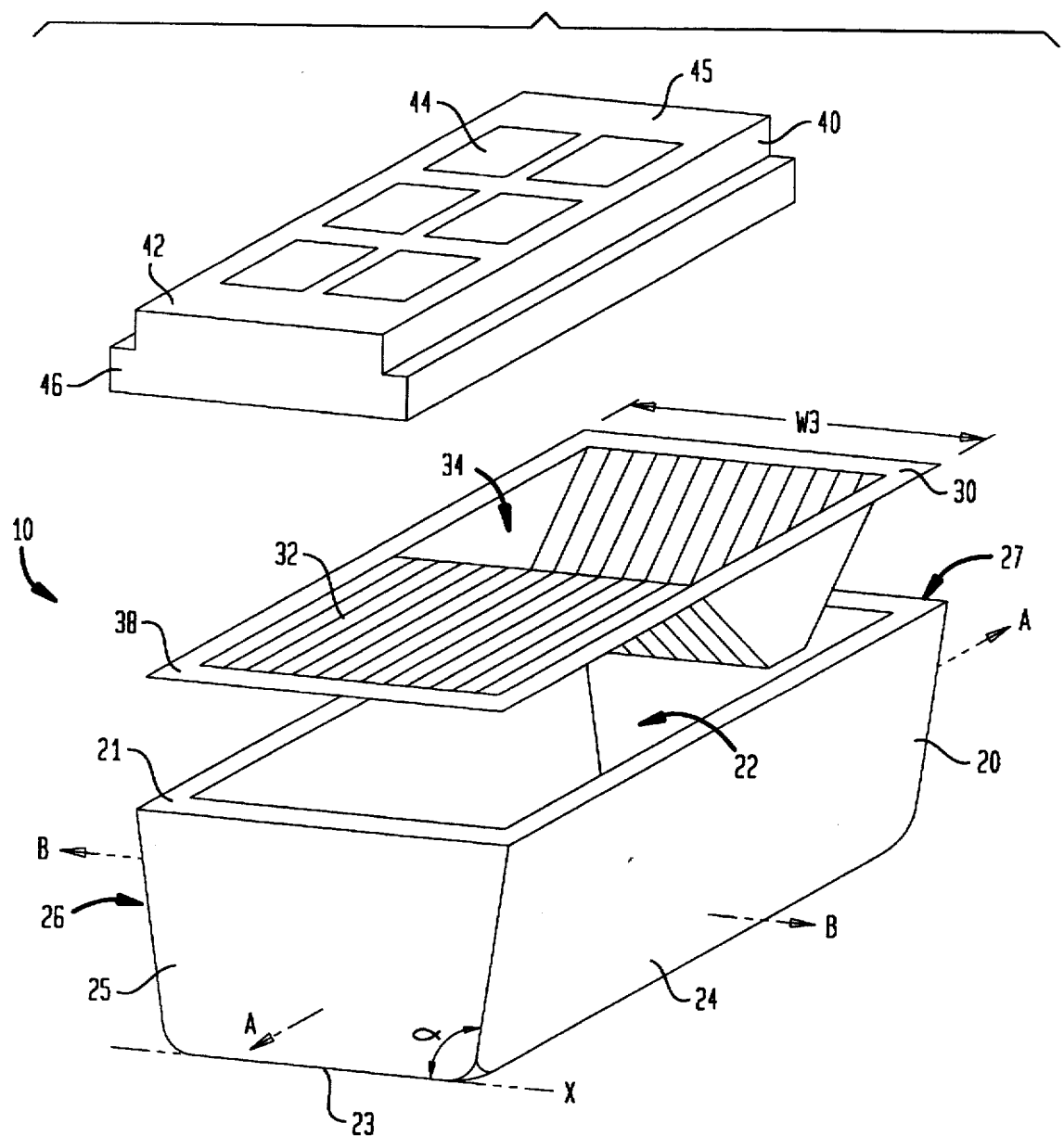
FIG. 1 shows a perspective view of a prior art cage apparatus including the receptacle, wire bar lid, and microbarrier top.
Figure 2A:
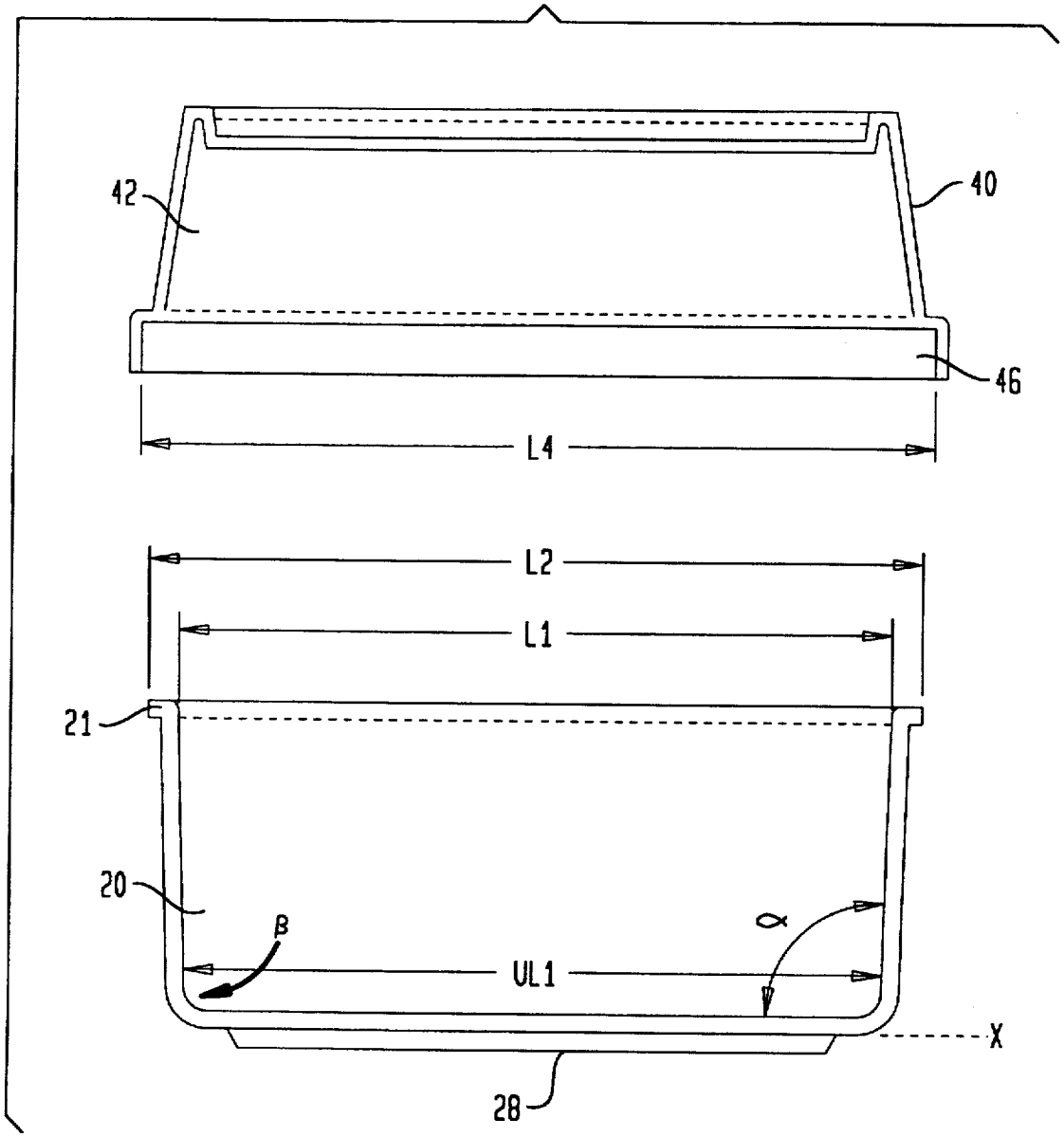
FIG. 2A shows a cross-sectional side view of the receptacle and microbarrier top of the caging apparatus of FIG. 1 along the line A—A of FIG. 1.

Referring to FIGS. 1 and 2A, a prior art cage receptacle 20 is shown basically as a rectangular-shaped box, as is typical. The receptacle has a top rim 21 defining an upper opening 22, a bottom surface or base 23, and four side walls 24, 25, 26, and 27. A spout optionally may be disposed on a sidewall (not shown), for automatic feeding of air or water into the cage when it is installed into a rack unit. The side walls are tapered, that is, they angle outwardly from the base 23 to the rim 21, to enable nestling of the cage receptacles when unused. An inner angle α (relative to the horizontal plane X parallel with the bottom of the receptacle) of about 93 to 94 degrees generally has been considered necessary to allow for the nestling of receptacles inside one another.

Figure 2B:
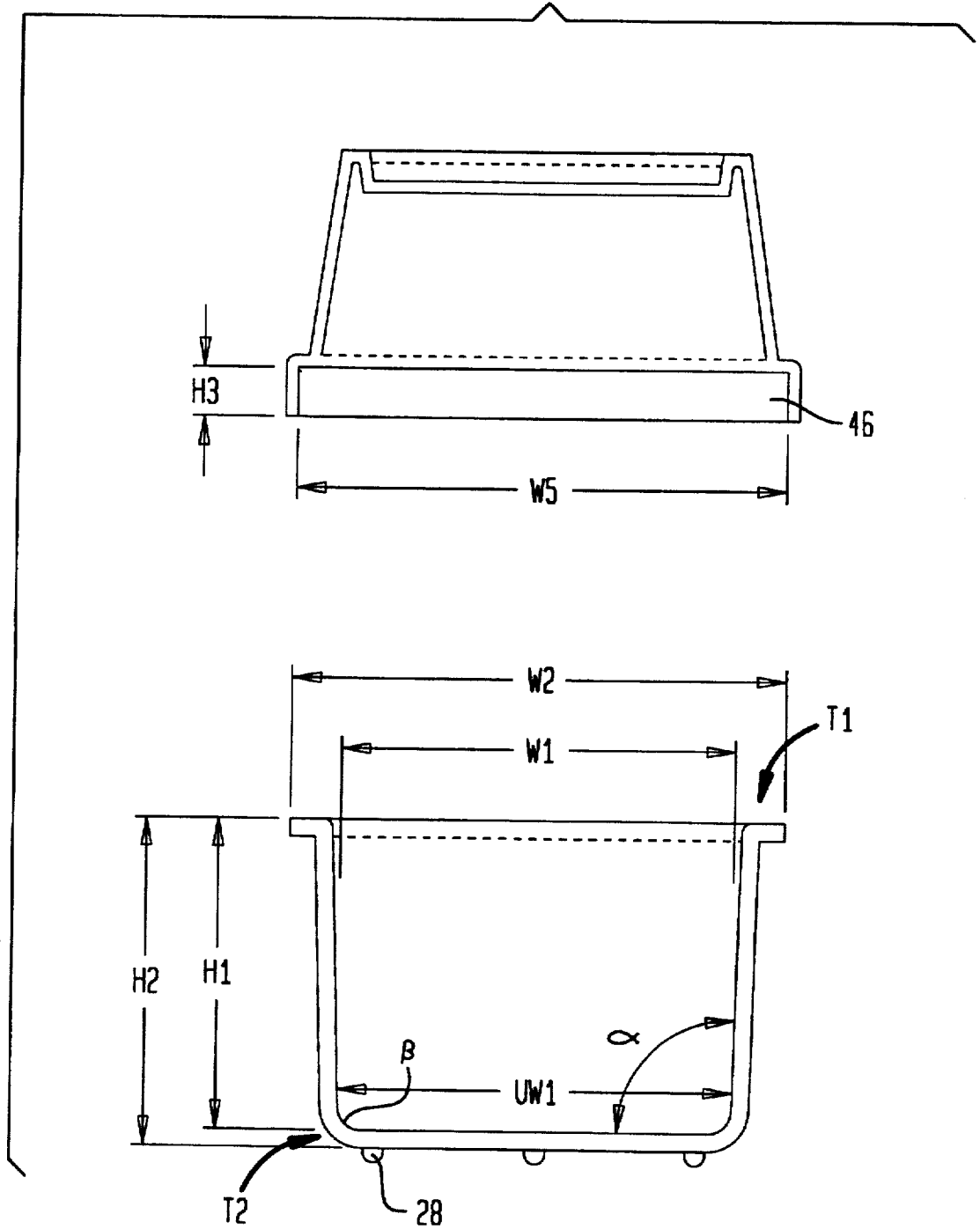
FIG. 2B shows a cross-sectional side view of the receptacle and microbarrier top of the caging apparatus of FIG. 1 along the line B—B of FIG. 1.

Looking at FIGS. 2A and 2B, in forming the desired angle α, the inner corners of the receptacle typically bend at a radius of curvature (β) of about 0.75 radius, as it is desirable to avoid any sharp edges on the cages. The rim 21 has a thickness T1 (FIG. 2B) of about 0.26 inches, an important consideration being that the rim be sufficiently thick to support the wire bar lid and microbarrier top. Referring to both FIGS. 2A and 2B, many prior art receptacles are made having an inner upper length L1 of about 11.2 inches; an outer upper length L2 of about 11.70 inches; an inner height H1 of about 4.8 inches; an outer height H2 of about 5.0 inches; an inner upper width W1 of about 6.9 inches, and an outer upper width W2 of about 7.4 inches, the thickness of the sidewall being generally uniform at a thickness T2 of about 0.094 inches.

The receptacle 20 is preferably fabricated with a polymeric material such as molded polycarbonate, copolymer polypropylene, or polyetherimide. The receptacle is typically made of a transparent or translucent plastic to allow for visibility of the mice. Runners (or elongated projections) 28 may be fabricated on the bottom surface of the base to aiding in sliding and securing the cages into a rack unit. Advantageously, three runners are used.

Figure 2C:
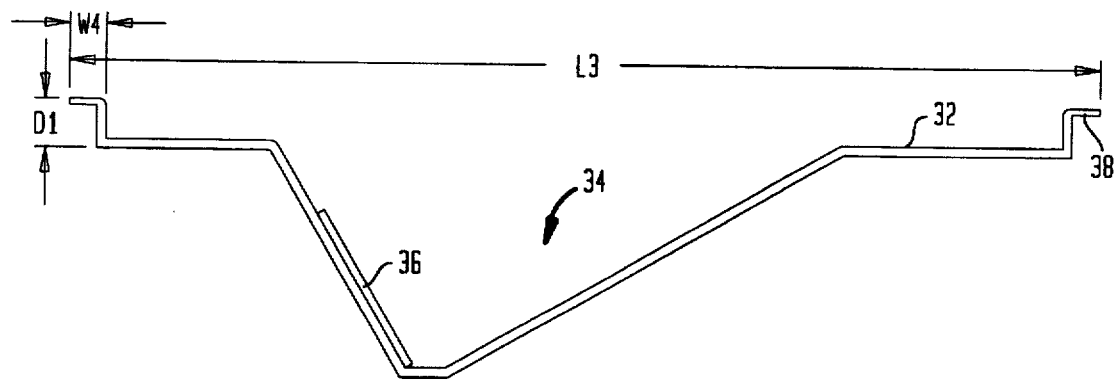
FIG. 2C shows a cross-sectional side view of the wire bar lid of the caging apparatus of FIG. 1 along the line A—A of FIG. 1.

Referring now to FIGS. 1 and 2C, the wire bar lid 30 is preferably fabricated with stainless steel, with its surface being grilled and having a front flat portion 32 and a back well portion 34. The well portion 34 is used to contain food and water bottles for the mice (or other laboratory animals). As can be seen in FIG. 2C, the well portion 34 may include a stopper guard 36 which is used to prevent the mice from chewing on rubber stoppers on the water bottles.

Referring still to FIGS. 1 and 2C, the wire bar lid 30 has a flat edge 38 surrounding its periphery, for resting against the rim 21 of the receptacle and thereby holding the wire bar lid in place, that is, preventing the force of gravity from causing the lid 30 to fall into the receptacle 20. The length of wire bar itself (L3) typically is 11.66 inches (FIG. 2C), and the width (W3) typically is about 7.38 inches (FIG. 1). Referring to FIG. 2C, the width of the flat edge 38 (W4) is typically about 0.34 inches, and the depth of the flat edge (D1) is typically about 0.62 inches.

Referring now to FIG. 1, the microbarrier top 40 has a promontory 42 in the center of the top for retaining filters 44 or other permeable material on its upper surface 45. The promontory 42 may have various heights. A lip 46 surrounds the promontory 42 and encircles the circumference of the top for securing the lid over the receptacle rim 21 and wire bar flat edge 38. Referring to FIG. 2A, the inner length of the microbarrier top (L4) at the lip portion 46 typically is about 11.7 inches; referring to FIG. 2B, its inner width (W5) at the lip 46 is typically about 7.4 inches. The inner height H3 (FIG. 2B), of the lip is typically about 0.75 inches.

The usable floor space is defined herein as the square-inch space allocation as measured from 0.5 inches above the base surface (inside the receptacle). Typically when the mice are housed in the receptacle, bedding will be placed on the base surface, with the bedding consuming about 0.5 inches. The usable floor space does not consider the radius of curvature at the corners of the receptacle. Likewise, the usable width is defined as the width of the receptacle measured from 0.5 inches above the base surface (inside the receptacle), and the usable length is the length measured from 0.5 inches above the base surface. When configured to accommodate the wire bar lids and microbarrier tops having the dimensions described above with reference to FIGS. 1 and 2, the usable width UW1 (FIG. 2B), and the usable length UL1 (FIG. 2A), of the receptacle 20 are about 6.46 inches and 10.72 inches, respectively, for a usable floor space of about 69.2 inches.

Referring now to FIGS. 3 through 6, there is shown a cage receptacle 60 that is compatible with the wire bar lid 30 and microbarrier top 40 described above with reference to FIGS. 1 and 2A–2C. Yet this receptacle 60 provides greater usable floor space than the receptacle 20 shown in the previous figures, and it is also allows for nestling.

Figure 3:
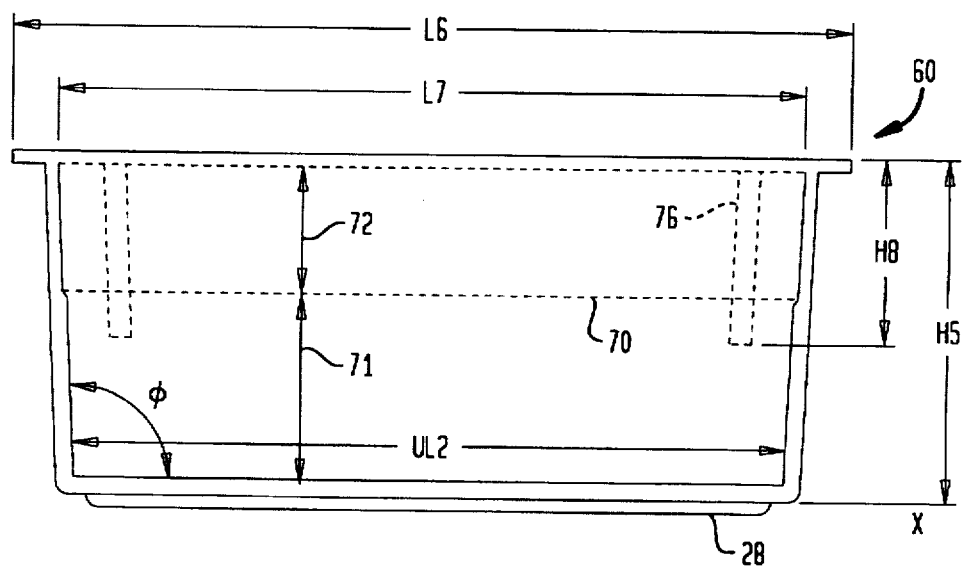
FIG. 3 shows a cross-sectional side view of the inventive cage receptacle taken along its length (i.e., comparable to line A—A of FIG. 1).
Figure 4:
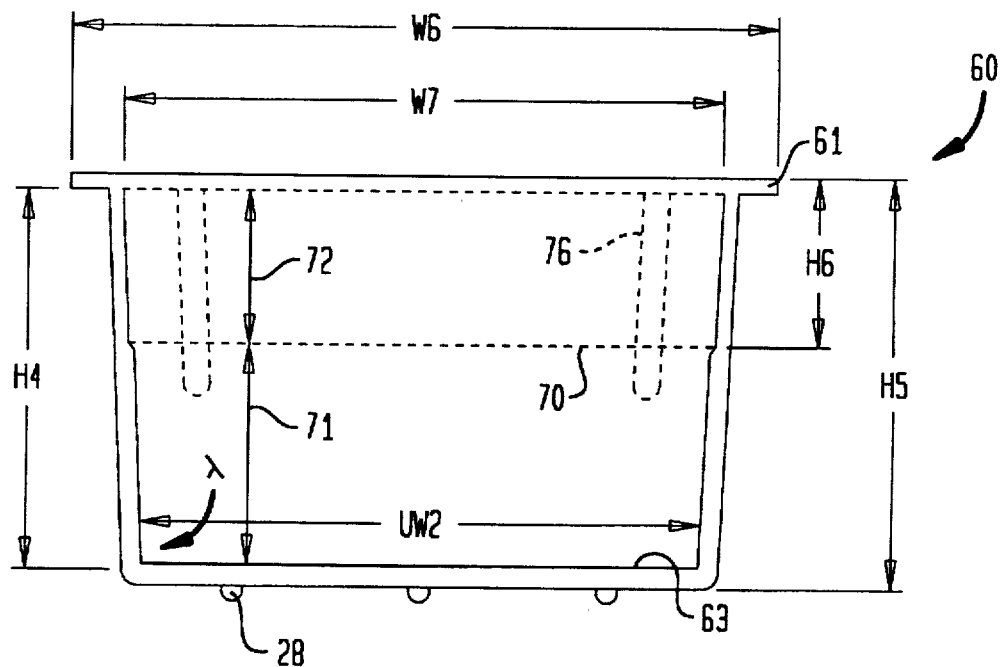
FIG. 4 shows a cross-sectional side view of the inventive cage receptacle taken along its width (i.e., comparable to line B—B of FIG. 1).
Figure 5:
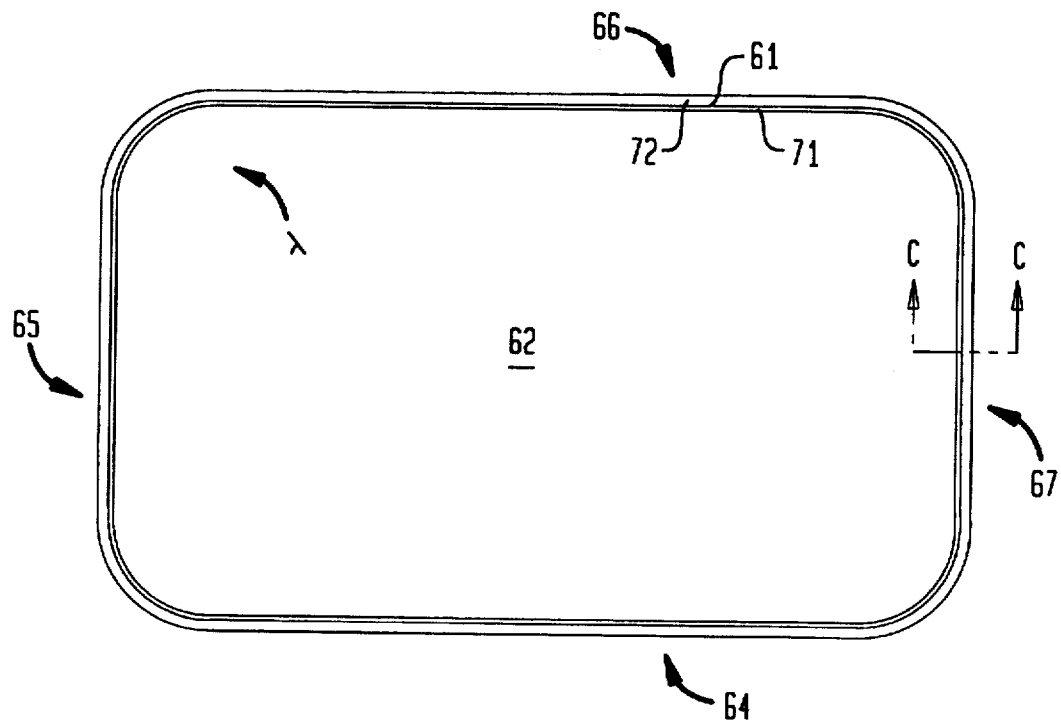
FIG. 5 shows a top view of the inventive cage receptacle.

Referring to FIGS. 3, 4, and 5, the receptacle 60 has a base 63 and four sidewalls 64, 65, 66, and 67 extending upwardly from the base and terminating in a rim 61 to define an upper opening 62. The height of the receptacle 60 is not changed as compared with the prior art receptacle 20; the inner height H4 is about 4.8 inches, and the outer height H5 is about 5.0 inches (FIG. 4). Notably, identical values were assigned for H1 and H2, above. Similarly, the outer dimensions at the upper portion of the receptacle adjacent the rim 61 are comparable to the outer dimensions described for the prior art receptacle 20. In particular, the outer length L6 shown in FIG. 3 is 11.75 inches (compared with an outer length L1 of 11.70 inches), and the outer width W6 shown in FIG. 4 is 7.406 inches (compared with an outer width W2 of 7.4 inches). Thus, the height and outer upper dimensions of the receptacle 60 are similar to those of the previously-described prior art receptacle 20, such that the receptacle 60 should be compatible with existing lids and tops. As will further be described below, the thickness of the rim 61 has been changed, but this has been done in a manner to maintain compatibility.

In achieving the enhanced usable floor space, in the receptacle 60, the taper of the sidewalls 64, 65, 66, and 67 relative to the base is altered so that the angle φ between each of the sidewalls and the horizontal plane X of the base is only slightly obtuse, i.e., preferably 92 degrees. The radius of curvature λ at the corners of the receptacle is about 0.375 inches. With the decrease in the radius of curvature and taper of the sidewalls, the usable length and width of the receptacle adjacent the base 63 are increased (as compared with the prior art receptacle 20).

It would not be possible, however, to obtain the desired increased usable floor space while maintaining compatibility with prior art top covers by adjusting the taper of the walls and the radius of curvature alone. Instead, such alterations would naturally cause an increase in the upper dimensions adjacent the rim of the receptacle, rendering the receptacle incompatible with existing top covers. Additionally, with only a slightly obtuse angle between each of the sidewalls and the horizontal plane X of the base, the receptacles could not be nestled inside of each other, without further design innovations. Instead, a ninety-degree angle, as with a slightly obtuse angle, would cause the receptacles to jam when placed on top of one another. Further constraints involve the desirability of designing the cage as a single, integral unit (thus avoiding the need for the assembling or disassembling of parts prior to storing or stacking), and the need to avoid sharp edges.

Figure 6:
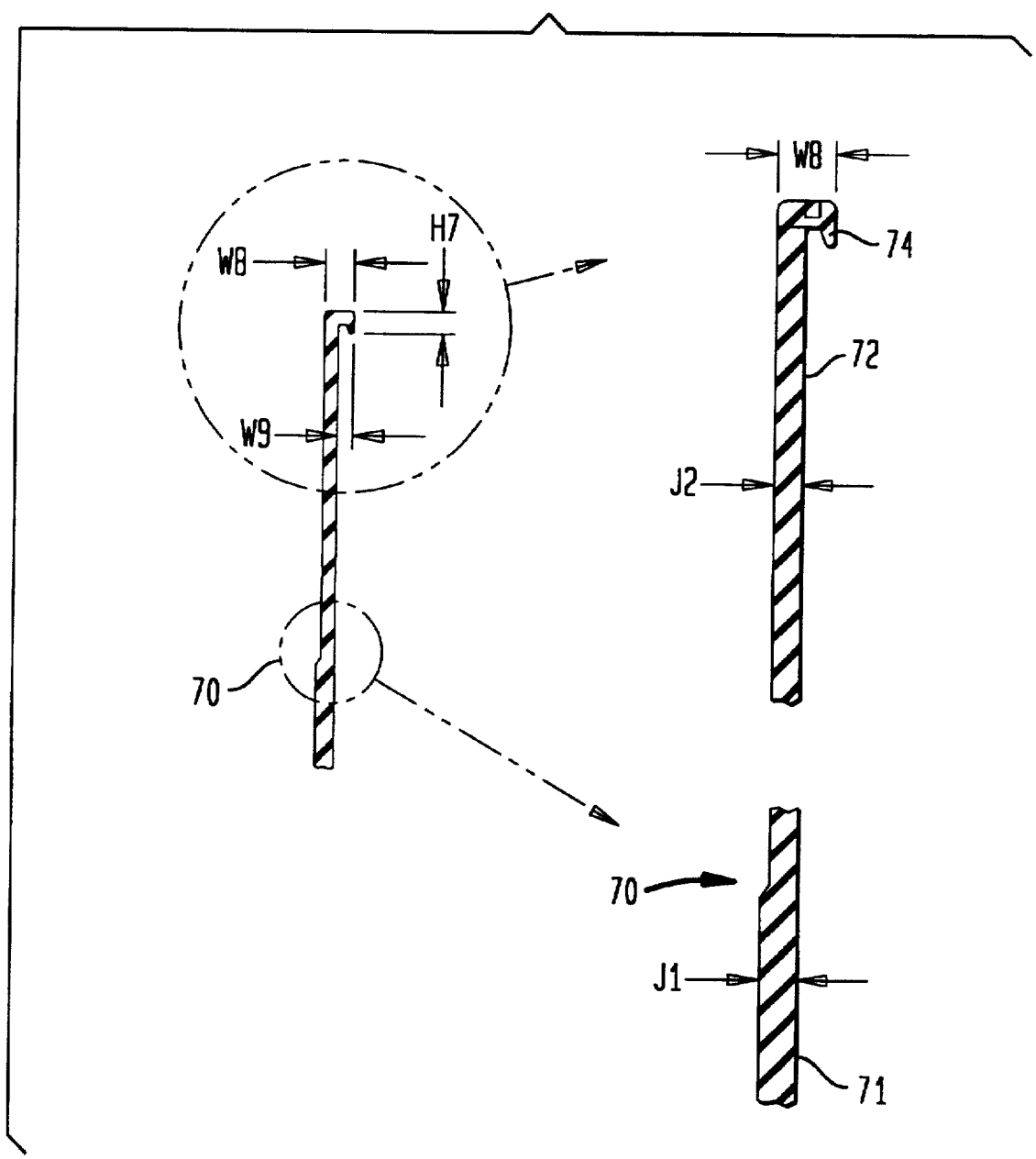
FIG. 6 shows an exploded cross-sectional view of the jag and rim of the inventive cage receptacle taken along the line C—C of FIG. 5.

To meet these design challenges, each of the plurality of sidewalls 64, 65, 66, and 67 are formed with a jag 70 (shown in FIGS. 3–6). The jag is defined by each of the sidewalls having a bottom wall section 71 and a top wall section 72. The bottom wall section 71 is disposed at the bottom portion of the receptacle adjacent the base 63, and the top wall section 72 is disposed at the top portion of the receptacle adjacent the rim 61. Referring to FIG. 6, there is shown an exploded cross-sectional view of the jag, taken along the line C—C of FIG. 5. The bottom wall section 71 is preferably about 0.096 inches (J1=0.096 inches) in thickness, and the top wall section 72 is preferably about 0.075 inches (J2=0.075 inches) in thickness. The top wall section 72 preferably has a height H6 (FIG. 4), of about 1.785 inches. Further, the dimensions of the rim 62 have been altered (as compared with prior art receptacles), and the new rim accommodates the design changes relating to the thickness of the sidewall at the top wall section 72 and the taper of the sidewalls while maintaining the desired exterior dimensions. The rim 61 has a width W8 of about 0.132 inches and a height H7 of about 0.120 inches. (FIG. 6). The width W9 of the ledge portion 74 of the rim 61, extending outwardly from the sidewall, is preferably about 0.062 inches.

Accordingly, with the widening of the base and reduction in the angle of the sidewall relative to the plane of the base, the usable floor space is enhanced. The jag accommodates those design changes while retaining the ability of the receptacle to receive existing wire bar lids and microbarrier tops and further allows for the nestling of one receptacle inside the opening of another. These design changes result in an increased inner length L7 at the receptacle rim of about 11.4 inches (FIG. 3), and an increased inner width W7 at the receptacle rim of about 7.1 inches (FIG. 4). The usable length UL2 is about 11.1 inches (FIG. 3), and the usable width UW2 is about 6.7 inches (FIG. 4), for a usable floor space of about 75 inches. A stacking lug 76 in the form of a protrusion from the sidewall optionally may be disposed on the exterior of the receptacle for holding the receptacles in place when they are stacked on top of one another (shown in FIGS. 3 and 4). Preferably the lug 76 has a height H8 of about 2.87 inches. The receptacle 60 may be made with any materials known in the field for fabricating cages, and preferably a transparent or translucent polymeric material such as molded polycarbonate, copolymer polypropylene, or polyetherimide is used. As with prior cages, runners (or elongated projections) 28 (preferably three) may be fabricated on the bottom surface of the base to aiding in sliding and securing the cages into a rack unit.

It will be understood that the embodiments described herein are merely exemplary and that a person skilled in the art may make variations and modifications without departing from the spirit and scope of the invention. All such variations and modifications are intended to be included within the scope of the appended claims.

We claim:

1. A receptacle for housing animals or laboratory creatures and configured to receive a top cover, the receptacle comprising:

a base;

at least one sidewall extending upwardly from the base and terminating in a rim to define an opening to the receptacle;

wherein the at least one sidewall has a bottom wall section and a top wall section, the bottom wall section being wider than the top wall section and disposed adjacent the base, and the top wall section being disposed adjacent the rim, the difference in width of the wall sections defining a jag for allowing the nestling of one receptacle inside the opening of another.

2. The receptacle according to claim 1, in which the at least one sidewall extends upwardly at an obtuse angle relative to the plane of the base, the obtuse angle being about 91 to 93 degrees.

3. The receptacle according to claim 2, in which the bottom wall section is about 0.09 to 0.1 inches in thickness and the top wall section is about 0.07 to 0.08 inches in thickness.

4. The receptacle according to claim 3, in which the base is substantially rectangular and the rim comprises a ledge extending outwardly from the at least one sidewall for supporting a top cover placed on the base.

5. The receptacle according to claim 4, in which the rim has a width of about 0.14 to 0.16 inches.

6. The receptacle according to claim 4, in which the usable floor space is about 75 inches.

7. The receptacle according to claim 6, in which the bottom wall section has a height of about 2.8 to 3.3 inches, and the top wall section has a height of about 1.7 to 2 inches.

8. The receptacle according to claim 7, in which the length of the base is about 10 to 12 inches, the width of the base is about 6.5 to 8 inches, and the height of the base is about 4.5 to 5 inches.

9. An improved receptacle for housing animals or laboratory creatures of the type having a base and at least one sidewall extending upwardly from the base and terminating in a rim to define an opening to the receptacle, the receptacle further being of the type configured to receive at least one top cover having predetermined dimensions, the improvement comprising:

a jag disposed in the at least one sidewall so that the sidewall has a bottom wall section and a top wall section, the bottom wall section being wider than the top wall section and disposed adjacent the base, and the top wall section being disposed adjacent the rim;

wherein the jag permits the widening of the base and reduction in the angle of the at least one sidewall relative to the plane of the base to increase the space allocation defined by the base and the at least one sidewall; retains the ability of the receptacle to receive the at least one top cover having predetermined dimensions; and allows for the nestling of one receptacle inside the opening of another.

10. The improved receptacle according to claim 9, in which the at least one top cover has a width of about 7 to 7.5 inches, and a length of about 11.5 to 11.75 inches.

11. The improved receptacle according to claim 10, in which the usable floor space is about 75 inches.

12. The improved receptacle according to claim 11, in which the bottom wall section is about 0.09 to 0.1 inches in thickness and the top wall section is about 0.07 to 0.08 inches in thickness.

13. The improved receptacle according to claim 12, in which the bottom wall section has a height of about 2.8 to 3.3 inches, and the top wall section has a height of about 1.7 to 2 inches.

14. The improved receptacle according to claim 9, in which the improvement further comprises the rim having a thickness of about 0.12 to 0.14 inches.

15. A method for expanding the space allocation of receptacles for housing animals or laboratory creatures while retaining their compatibility with existing top covers and enabling the nestling of the receptacles, the receptacles being of the type having a base and at least one sidewall extending upwardly from the base and terminating in a rim to define an opening to the receptacle, the method comprising the steps of:

increasing the size of the base;

decreasing the angle disposed between the plane of the base and the at least one sidewall; and placing a jag in the at least one sidewall so that the at least one sidewall has a bottom wall section and a top wall section, the bottom wall section being wider than the top wall section and disposed adjacent the base, and the top wall section being disposed adjacent the rim to allowing for the nestling of one receptacle inside the opening of another while retaining the ability of the receptacle to receive the existing top covers.

16. The method according to claim 15, further comprising the step of decreasing the width of the rim.

* * * * *